United States Patent
Speier

(10) Patent No.: US 11,061,820 B2
(45) Date of Patent: Jul. 13, 2021

(54) OPTIMIZING ACCESS TO PAGE TABLE ENTRIES IN PROCESSOR-BASED DEVICES

(71) Applicant: Microsoft Technology Licensing, LLC, Redmond, WA (US)

(72) Inventor: Thomas Philip Speier, Wake Forest, NC (US)

(73) Assignee: Microsoft Technology Licensing, LLC, Redmond, WA (US)

(*) Notice: Subject to any disclaimer, the term of this patent is extended or adjusted under 35 U.S.C. 154(b) by 21 days.

(21) Appl. No.: 16/556,282

(22) Filed: Aug. 30, 2019

(65) Prior Publication Data

US 2021/0064537 A1 Mar. 4, 2021

(51) Int. Cl.
*G06F 12/1009* (2016.01)
*G06F 9/38* (2018.01)
*G06F 12/1027* (2016.01)
*G06F 9/30* (2018.01)

(52) U.S. Cl.
CPC ........ *G06F 12/1009* (2013.01); *G06F 9/3004* (2013.01); *G06F 9/3818* (2013.01); *G06F 12/1027* (2013.01); *G06F 2212/651* (2013.01); *G06F 2212/657* (2013.01)

(58) Field of Classification Search
CPC ............... G06F 12/1009; G06F 9/3818; G06F 12/1027; G06F 9/3004; G06F 2212/651; G06F 2212/657
See application file for complete search history.

(56) References Cited

U.S. PATENT DOCUMENTS

| | | | |
|---|---|---|---|
| 2003/0120880 A1* | 6/2003 | Banno | G11C 7/1006 711/155 |
| 2016/0140043 A1* | 5/2016 | Mukherjee | G06F 12/1009 711/123 |
| 2016/0140048 A1* | 5/2016 | Mukherjee | G06F 12/128 711/135 |

(Continued)

OTHER PUBLICATIONS

"International Search Report and Written Opinion Issued in PCT Application No. PCT/US20/037673", dated Oct. 1, 2020, 11 Pages.

(Continued)

*Primary Examiner* — Sean D Rossiter
(74) *Attorney, Agent, or Firm* — Withrow & Terranova, PLLC

(57) ABSTRACT

Optimizing access to page table entries in processor-based devices is disclosed. In this regard, an instruction decode stage of an execution pipeline of a processor-based device receives a memory access instruction including a virtual memory address. A page table walker circuit of the processor-based device determines, based on the memory access instruction, a number T of page table walk levels to traverse, where T is greater than zero (0) and less than or equal to a number of page table walk levels required to fully translate the virtual memory address. The page table walker next performs a page table walk of T page table walk levels of the multilevel page table, and identifies a physical memory address corresponding to a page table entry of the $T^{th}$ page table walk level. The processor-based device then performs a memory access operation indicated by the memory access instruction using the physical memory address.

20 Claims, 6 Drawing Sheets

(56) References Cited

U.S. PATENT DOCUMENTS

2018/0239712 A1* 8/2018 Lea .................... G06F 12/1009

OTHER PUBLICATIONS

"Recursive Page Tables", Retrieved at: https://medium.com/@connorstack/recursive-page-tables-ad1e03b20a85, Oct. 31, 2016, 3 Pages.

"Page Tables", Retrieved at: https://os.phil-opp.com/page-tables/, Dec. 9, 2015, 30 Pages.

* cited by examiner

OPTIMIZING ACCESS TO PAGE TABLE ENTRIES IN PROCESSOR-BASED DEVICES

FIELD OF THE DISCLOSURE

The technology of the disclosure relates to accessing page tables entries in processor-based devices and, more particularly, to accessing page table entries in multilevel page tables.

BACKGROUND

Page tables are data structures used by modern processor-based devices to provide virtual memory functionality. A page table provides page table entries that store mappings between virtual memory addresses and corresponding physical memory addresses (i.e., addresses of memory locations in a system memory). When a processor-based device needs to translate a virtual memory address into a physical memory address, the processor-based device accesses the page table to locate the page table entry associated with the virtual memory address, and then reads the corresponding physical memory address from the page table entry. Recently accessed mappings may also be cached by the processor-based device in a translation lookaside buffer (TLB) for subsequent reuse without the need to repeat the translation process. By using page tables to implement virtual memory functionality, the processor-based device enables software processes to access secure memory spaces that are isolated from one another, and that together may be conceptually larger than the available physical memory.

A multilevel page table is a page table variant that makes use of multiple page tables organized into a hierarchical data structure. To translate a virtual memory address using a multilevel page table, a hardware element provided by the processor-based device and known as a "page table walker" performs a "page table walk." In the first step of the page table walk, the page table walker uses a base address pointing to the highest-level page table in the multilevel page table, and applies the topmost set of bits of the virtual memory address as an index to access a page table entry in the highest-level page table. That page table entry provides a pointer to a next-lower page table, which the page table walker uses in combination with a next-lower set of bits of the virtual memory address to access a page table entry in the next-lower page table. The page table entry in the next-lower page table contains a pointer to another next-lower page table, and so on. The page table at the lowest level of the multilevel page table provides a pointer to a physical memory page, which is used in combination with the bottommost set of bits of the virtual memory address to determine the physical memory address corresponding to the virtual memory address.

In some scenarios, it may be desirable to enable a software process to modify the contents of the page tables themselves (e.g., to update a physical memory address stored in a page table entry of a page table, or to modify access permissions on a corresponding memory page, as non-limiting examples). To do so, the software process seeking to modify the page table entry must first acquire the physical memory address of that page table entry within the system memory. One approach to obtaining the physical memory address of a page table entry involves recursive mapping of each page table of a multilevel page table, such that the last page table entry (i.e., the page table entry with the highest index associated with the virtual memory address) of each page table stores a pointer to that page table.

Before the software process executes a memory access operation on the page table entry, the software process first performs a right bit shift on the virtual memory address, and populates the upper bits of the virtual memory address with ones (1s). The page table walker then performs a conventional page table walk using the shifted virtual memory address. Because the topmost set of bits of the virtual memory address that are used as an index into the highest-level page table are all ones (1s), the page table entry that is accessed first by the page table walker is the last page table entry in the highest-level page table, which merely points back to the highest-level page table. As a result, the page table walker, which is conventionally configured to traverse a specified number of levels of the multilevel page table when performing a page table walk, will end its page table walk one level "early," and will return the physical memory address of the page table entry in the lowest-level page table instead of a physical memory address in the system memory.

While recursive mapping does provide a solution that allows a memory access instruction to access the page table entry itself, this approach does have disadvantages. In particular, recursive mapping requires a dedicated page table entry in each page table of the multilevel page table, which reduces the number of page table entries available for address translation. Additionally, while the recursive page table accesses performed by the page table walker may be cached in a TLB, the cached recursive mappings are usable only for subsequent recursive mappings, which can result in decreased efficiency.

Accordingly, a more efficient mechanism for obtaining physical memory addresses for page table entries in a multilevel page table is desirable.

SUMMARY

Exemplary embodiments disclosed herein include optimizing access to page table entries in processor-based devices. In this regard, in one exemplary embodiment, an instruction decode stage of an execution pipeline of a processor-based device receives a memory access instruction (e.g., a memory load instruction, a memory store instruction, or a memory read/modify/write instruction, as non-limiting examples) that includes a virtual memory address. A page table walker circuit of the processor-based device determines, based on the memory access instruction, a number T of page table walk levels to traverse, where T is greater than zero (0) and less than or equal to a number of page table walk levels required to fully translate the virtual memory address. In some embodiments, the memory access instruction may provide a traverse indicator that explicitly specifies the number T of page table walk levels to traverse, while some embodiments may provide that the number T of page table walk levels to traverse may be determined based on a count of recursive traversals indicated by the virtual memory address. The page table walker next performs a page table walk of T page table walk levels of the multilevel page table, and identifies a physical memory address corresponding to a page table entry of the Tth page table walk level. The processor-based device then performs a memory access operation indicated by the memory access instruction using the physical memory address.

In another exemplary embodiment, a processor-based device is provided. The processor-based device includes a system memory that comprises a multilevel page table made up of a plurality of page tables, each page table comprising a plurality of page table entries. The processor-based device further includes a processing element (PE) that comprises an execution pipeline comprising an instruction decode stage, and a page table walker circuit. The PE is configured to receive, using the instruction decode stage, a memory access instruction comprising a virtual memory address. The PE is further configured to determine, using the page table walker circuit based on the memory access instruction, a number T of page table walk levels to traverse, wherein T is greater than zero (0) and less than or equal to a number of page table walk levels required to fully translate the virtual memory address. The PE is also configured to perform, using the page table walker circuit based on the virtual memory address, a page table walk of T page table walk levels of the multilevel page table. The PE is additionally configured to identify, based on the page table walk, a physical memory address corresponding to a page table entry of the Tth page table walk level. The PE is further configured to perform a memory access operation indicated by the memory access instruction using the physical memory address.

In another exemplary embodiment, a method for optimizing access to page table entries is provided. The method comprises receiving, by an instruction decode stage of an execution pipeline of a processing element (PE) of a processor-based device, a memory access instruction comprising a virtual memory address. The method further comprises determining, by a page table walker circuit of the PE based on the memory access instruction, a number T of page table walk levels to traverse, wherein T is greater than zero (0) and less than or equal to a number of page table walk levels required to fully translate the virtual memory address. The method also comprises performing, by the page table walker circuit of the PE based on the virtual memory address, a page table walk of T page table walk levels of a multilevel page table. The method additionally comprises identifying, based on the page table walk, a physical memory address corresponding to a page table entry of the Tth page table walk level. The method further comprises performing a memory access operation indicated by the memory access instruction using the physical memory address.

In another exemplary embodiment, a non-transitory computer-readable medium is provided, the computer-readable medium having stored thereon computer-executable instructions which, when executed by a processor, cause the processor to receive a memory access instruction comprising a virtual memory address. The computer-executable instructions further cause the processor to determine, based on the memory access instruction, a number T of page table walk levels to traverse, wherein T is greater than zero (0) and less than or equal to a number of page table walk levels required to fully translate the virtual memory address. The computer-executable instructions also cause the processor to perform, based on the virtual memory address, a page table walk of T page table walk levels of a multilevel page table. The computer-executable instructions additionally cause the processor to identify, based on the page table walk, a physical memory address corresponding to a page table entry of the Tth page table walk level. The computer-executable instructions further cause the processor to perform a memory access operation indicated by the memory access instruction using the physical memory address.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

DETAILED DESCRIPTION

Exemplary embodiments disclosed herein include optimizing access to page table entries in processor-based devices. In one exemplary embodiment, an instruction decode stage of an execution pipeline of a processor-based device receives a memory access instruction (e.g., a memory load instruction, a memory store instruction, or a memory read/modify/write instruction, as non-limiting examples) that includes a virtual memory address. A page table walker circuit of the processor-based device determines, based on the memory access instruction, a number T of page table walk levels to traverse, where T is greater than zero (0) and less than or equal to a number of page table walk levels required to fully translate the virtual memory address. In some embodiments, the memory access instruction may provide a traverse indicator that explicitly specifies the number T of page table walk levels to traverse, while some embodiments may provide that the number T of page table walk levels to traverse may be determined based on a count of recursive traversals indicated by the virtual memory address. The page table walker next performs a page table walk of T page table walk levels of the multilevel page table, and identifies a physical memory address corresponding to a page table entry of the $T^{th}$ page table walk level. The processor-based device then performs a memory access operation indicated by the memory access instruction using the physical memory address.

Figure 1:
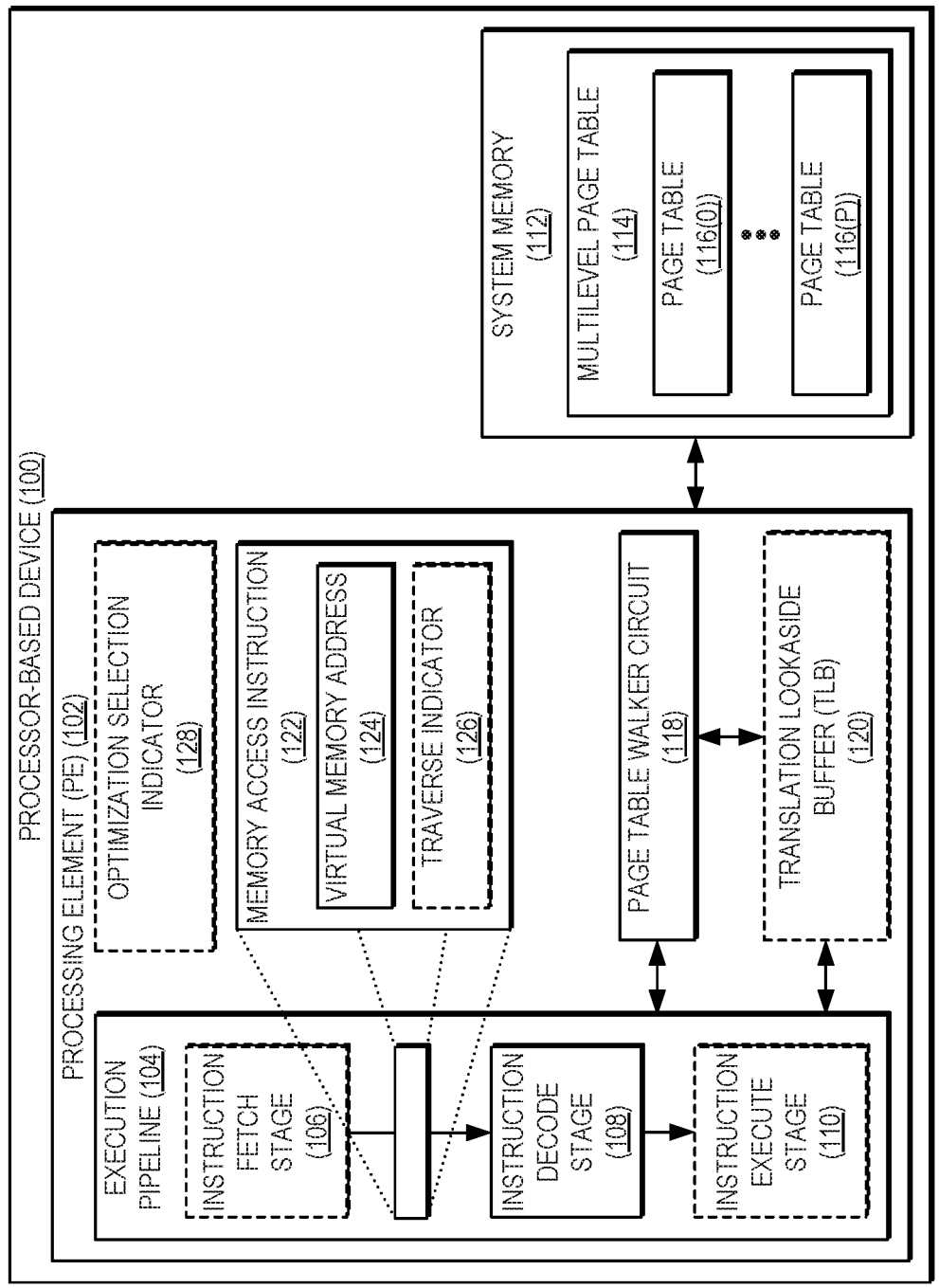
FIG. 1 is a schematic diagram of an exemplary processor-based device that includes a processing element (PE) comprising a page table walker circuit configured to optimize access to page table entries.

In this regard, FIG. 1 illustrates an exemplary processor-based device 100 that provides a processing element (PE) 102 for processing executable instructions. The PE 102 may comprise a central processing unit (CPU) having one or more processor cores, or may comprise an individual processor core comprising a logical execution unit and associated caches and functional units. The PE 102 of FIG. 1 includes an execution pipeline 104 that is configured to execute an instruction stream comprising computer-executable instructions. In the example of FIG. 1, the execution pipeline 104 includes an instruction fetch stage 106 for retrieving instructions for execution, an instruction decode stage 108 for translating fetched instructions into control signals for instruction execution, and an instruction execute stage 110 for actually performing instruction execution. It is to be understood that some embodiments of the processor-based device 100 may comprise multiple PEs 102 rather than the single PE 102 shown in the example of FIG. 1, and further that some embodiments of the PE 102 may include fewer or more stages within the execution pipeline 104 than those illustrated in the example of FIG. 1.

The PE 102 of FIG. 1 is communicatively coupled to a system memory 112, which stores a multilevel page table 114 comprising a plurality of page tables 116(0)-116(P) for use in virtual-to-physical address translation. The PE 102 of FIG. 1 also includes a page table walker circuit 118 that embodies logic for performing page table walks on the multilevel page table 114 to translate virtual memory addresses into physical memory addresses. Some embodiments of the PE 102 further include a translation lookaside buffer (TLB) 120 for caching recent translations of virtual memory addresses to physical memory addresses for subsequent reuse. The structure and functionality of the multilevel page table 114 and the page table walker circuit 118 for performing virtual-to-physical address translation is discussed in greater detail below with respect to FIG. 2.

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include elements in addition to those illustrated in FIG. 1. For example, the PE 102 may further include one or more instruction caches, unified caches, memory controllers, interconnect buses, and/or additional memory devices, caches, and/or controller circuits.

As discussed above, circumstances may arise in which it is desirable to allow a software process being executed by the PE 102 to modify the contents of the page tables 116(0)-116(P) of the multilevel page table 114. As non-limiting examples, the software process may need to update a physical memory address stored in a page table entry of one of the page tables 116(0)-116(P), or may need to modify access permissions on a corresponding memory page. To modify a page table entry, a physical memory address of the page table entry itself within the system memory 112 must first be determined. Existing solutions for enabling software processes to access page table entries may involve recursively mapping each of the page tables 116(0)-116(P) of the multilevel page table 114, such that the last page table entry (i.e., the page table entry with the highest index associated with the virtual memory address) of each of the page tables 116(0)-116(P) stores a pointer to that page table 116(0)-116(P). However, recursive mapping requires a dedicated page table entry in each of the page tables 116(0)-116(P) of the multilevel page table 114, which reduces the number of page table entries available for address translation. Additionally, while recursive page table accesses performed by the page table walker circuit 118 may be cached in the TLB 120, the cached recursive mappings are usable only for subsequent recursive mappings, which can result in decreased efficiency.

In this regard, the PE 102 is configured to provide optimized access to page table entries in processor-based devices. In an exemplary embodiment, the instruction decode stage 108 of the execution pipeline 104 receives a memory access instruction 122. The memory access instruction 122 includes a virtual memory address 124, and, in some embodiments, may be a memory load instruction, a memory store instruction, or a memory read/modify/write instruction, as non-limiting examples. The page table walker circuit 118 determines, based on the memory access instruction 122, a number T of page table walk levels to traverse, where T is greater than zero (0) and less than or equal to a number of page table walk levels required to fully translate the virtual memory address 124. In some embodiments, the memory access instruction 122 may provide a traverse indicator 126 that explicitly specifies the number T of page table walk levels to traverse. The traverse indicator 126 may comprise an immediate value operand, or may comprise a register operand indicating a register that stores the number T of page table walk levels to traverse. According to some embodiments, the number T of page table walk levels to traverse may be determined automatically based on a count of recursive traversals indicated by the virtual memory address 124.

The page table walker circuit 118 then performs a page table walk of T page table walk levels of the multilevel page table 114, and identifies a physical memory address corresponding to a page table entry of the Tth page table walk level. The PE 102 performs a memory access operation indicated by the memory access instruction 122 using the physical memory address returned by the page table walker circuit 118 (e.g., by executing the memory access instruction 122 using the instruction execute stage 110). In embodiments in which the memory access instruction 122 is a memory load instruction or a memory read/modify/write instruction, performing the memory access operation may include returning a content of a memory location indicated by the physical memory address. Embodiments in which the memory access instruction 122 is a memory store instruction or a memory read/modify/write instruction may provide that performing the memory access operation includes writing store data to a memory location indicated by the physical memory address.

Some embodiments of the PE 102 in which the number T of page table walk levels to traverse may be determined automatically may further provide an optimization selection indicator 128 to enable selective activation of the optimized page table access feature described herein. In such embodiments, after receiving the memory access instruction 122 by the instruction decode stage 108 of the execution pipeline 104, the PE 102 determines whether the optimization selection indicator 128 is in a set state. If so, the operations described above for determining the number T of page table walk levels to traverse and performing the page table walk of T page table walk levels of the multilevel page table 114 are carried out. If the optimization selection indicator 128 is not in a set state, the page table walker circuit 118 performs a page table walk in conventional fashion.

Figure 2:
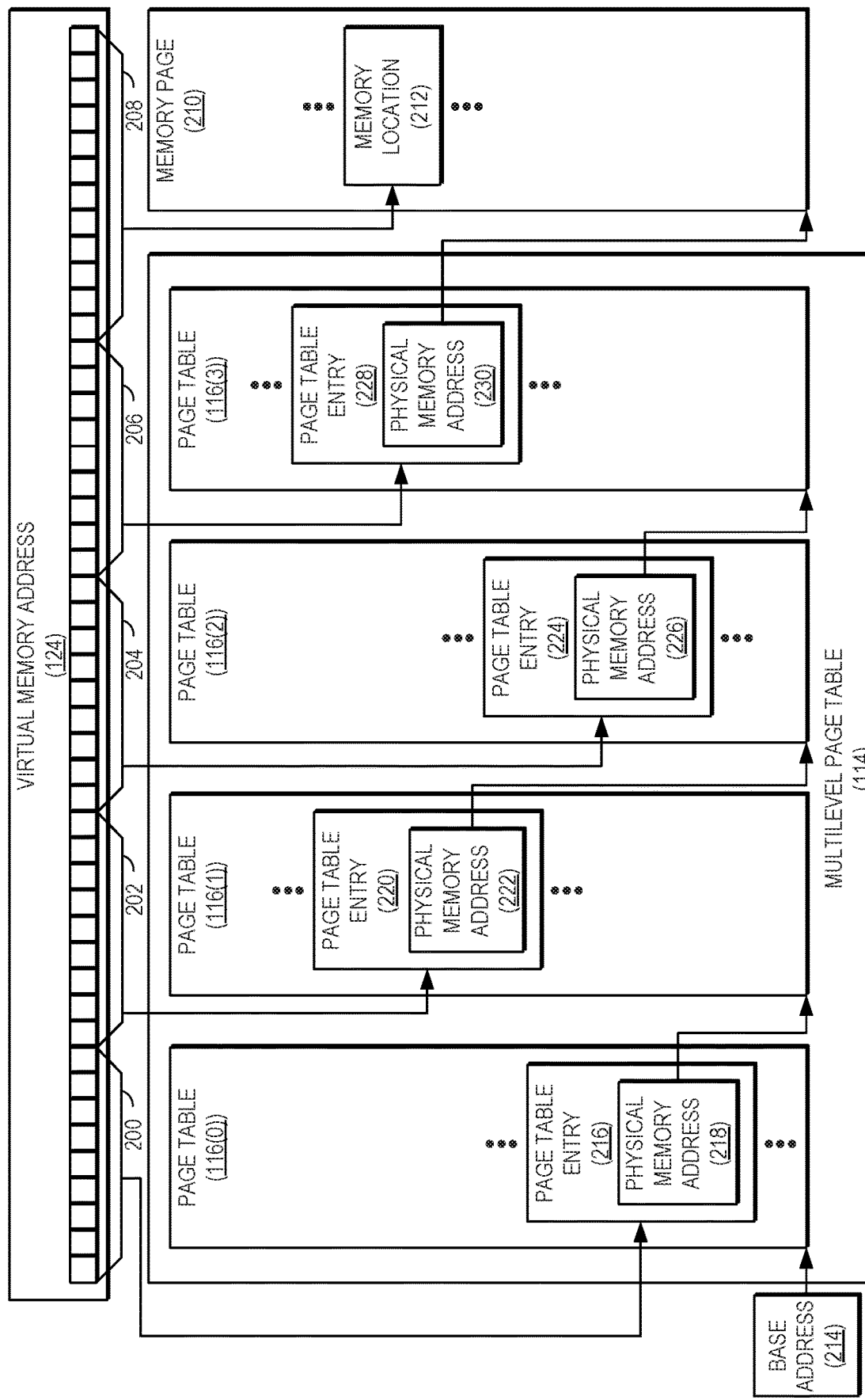
FIG. 2 is a block diagram illustrating an exemplary traversal of the multilevel page table of FIG. 1 and its constituent page tables for optimizing access to page table entries.

To provide a more detailed description of the structure and functionality of the multilevel page table 114 both in conventional use and in providing optimized access to page table entries, FIG. 2 is provided. As seen in FIG. 2, the virtual memory address 124 of FIG. 1 is being used to traverse the page tables 116(0)-116(3) (i.e., the page tables 116(0)-116(P) where P=3, in this example) of the multilevel page table 114 of FIG. 1. In the example of FIG. 2, the virtual memory address 124 comprises 48 bits that are relevant for virtual memory address translation. The virtual memory address 124 is divided into four (4) bit sets 200, 202, 204, and 206 of nine (9) bits each, and one (1) bit set 208 comprising the lowest 12 bits of the virtual memory address 124. Each of the bits sets 200, 202, 204, and 206 are used as indices into the corresponding page tables 116(0)-116(3), while the bit set 208 is used as an offset into a memory page 210 containing the memory location 212 that ultimately corresponds to the virtual memory address 124.

In conventional operation, the page table walker circuit 118 performs a page table walk that traverses four (4) page table walk levels to translate the virtual memory address 124 into a corresponding physical memory address. First, the page table walker circuit 118 retrieves a base address 214 indicating the physical memory address of the page table 116(0). The base address 214 is then added to the value of the bit set 200 of the virtual memory address 124 to generate a physical memory address of the page table entry 216 of the page table 116(0). This is considered the first page table walk level traversed by the page table walker circuit 118.

Once the physical memory address of the page table entry 216 is determined, the page table walker circuit 118 accesses the physical memory address 218 stored in the page table entry 216, which points to the next page table 116(1) in the multilevel page table 114. The physical memory address 218 is then added to the value of the bit set 202 of the virtual memory address 124 to generate a physical memory address of the page table entry 220 of the page table 116(1). These operations constitute the second page table walk level traversed by the page table walker circuit 118. The page table walk continues in similar fashion, with the third page table walk level using the physical memory address 222 stored in the page table entry 220 and the bit set 204 to generate the physical memory address of the page table entry 224 of the page table 116(2), and the fourth page table walk level using the physical memory address 226 stored in the page table entry 226 and the bit set 206 to generate the physical memory address of the page table entry 228 of the page table 116(3). Finally, the page table walker circuit 118 uses the physical memory address 230 stored in the page table entry 228, in combination with the bit set 208 of the virtual memory address 124, to generate a physical memory address that represents the translation of the virtual memory address 124, and that points to the memory location 212 in the memory page 210.

In the conventional example described above, the page table walker circuit 118 performs a page table walk of four (4) page table walk levels to translate the virtual memory address 124 into the physical memory address of the memory location 212. However, embodiments of the PE 102 of FIG. 1 for optimizing access to page table entries allows for a fewer number of page table walk levels to be performed, which enables software processes to obtain physical memory addresses of the page table entries of the page tables 116(0)-116(P) of the multilevel page table 114 used to perform translation of the virtual memory address 124. For example, to obtain the physical memory address of the page table entry 220 of the page table 116(1), only two (2) page table walk levels need to be traversed: one to use the base address 214 and the bit set 200 to determine the physical memory address of the page table entry 216 of the page table 116(0), and one to use the physical memory address 218 stored in the page table entry 216 along with the bit set 202 to determine the physical memory address of the page table entry 220. Accordingly, executing the memory access instruction 122 of FIG. 1 while specifying two (2) page table walk levels (e.g., explicitly using the traverse indicator 126, or implicitly by the virtual memory address 124 indicating recursive traversals) results in the physical memory address of the page table entry 220 being used for the memory access operation.

Figure 3C:
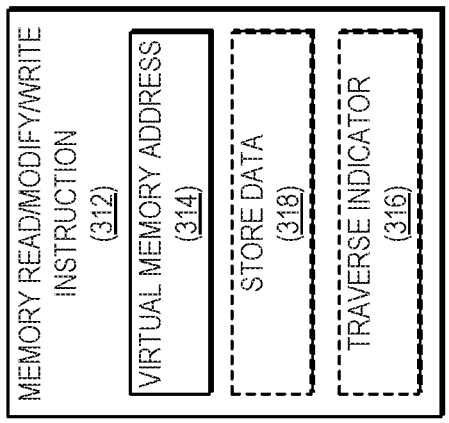
FIGS. 3A-3C are block diagrams illustrating an exemplary memory load instruction, an exemplary memory store instruction, and an exemplary memory read/modify/write instruction, respectively, corresponding to the memory access instruction of FIG. 1.
Figure 3B:
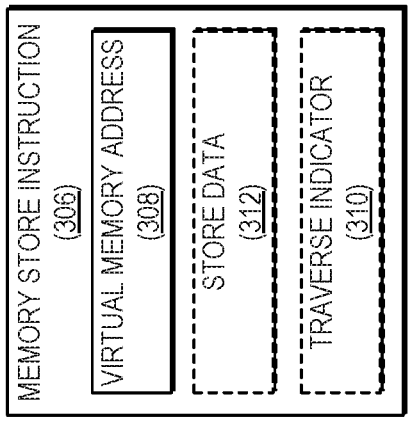
Figure 3A:
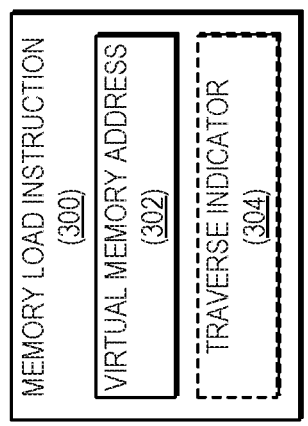

As noted above, the memory access instruction 122 of FIG. 1 may be a memory load instruction, a memory store instruction, or a memory read/modify/write instruction, as non-limiting examples. In this regard, FIGS. 3A-3C illustrate an exemplary memory load instruction, an exemplary memory store instruction, and an exemplary read/modify/write instruction, respectively, corresponding to the memory access instruction 122 of FIG. 1. In FIG. 3A, a memory load instruction 300, corresponding to the memory access instruction 122 of FIG. 1 in some embodiments, includes a virtual memory address 302 corresponding to the virtual memory address 124 of FIG. 1. In some embodiments, the memory load instruction 300 may also include a traverse indicator 304 corresponding in functionality to the traverse indicator 126 of FIG. 1.

Similarly, in FIG. 3B, a memory store instruction 306, which according to some embodiments may correspond to the memory access instruction 122 of FIG. 1, provides a virtual memory address 308 and a traverse indicator 310 corresponding to the virtual memory address 124 and the traverse indicator 126, respectively, of FIG. 1. The memory store instruction 306 further includes store data 312, representing data to be written to the memory location indicated by the physical memory address resulting from the page table walk of the T page table walk levels of the multilevel page table 114 described above with respect to FIGS. 1 and 2. In some embodiments, the store data 312 may comprise an immediate value to be written to the memory location, or may comprise a register operand indicating a register that stores data to be written to the memory location.

FIG. 3C illustrates a memory read/modify/write instruction 312, which may correspond to the memory access instruction 122 of FIG. 1 in some embodiments. Like the memory store instruction 306, the memory read/modify/write instruction 312 provides a virtual memory address 314 and a traverse indicator 316 corresponding to the virtual memory address 124 and the traverse indicator 126, respectively, of FIG. 1. The memory read/modify/write instruction 312 also includes store data 318, which represents data to be written to the memory location indicated by the physical memory address resulting from the page table walk of the T page table walk levels of the multilevel page table 114 described above with respect to FIGS. 1 and 2. The store data 318 according to some embodiments may comprise an immediate value to be written to the memory location, or may comprise a register operand indicating a register that stores data to be written to the memory location.

It is to be understood that the memory load instruction 300, the memory store instruction 306, and the memory read/modify/write instruction 312 in some embodiments may each be implemented within the PE 102 as dedicated instructions with unique opcodes provided by an instruction set architecture (ISA) of the PE 102. Alternatively or additionally, the memory load instruction 300, the memory store instruction 306, and/or the memory read/modify/write instruction 312 may be conventional memory access instructions to which additional operands and/or opcode bits are added to accomplish the functionality described herein.

Figure 4A:
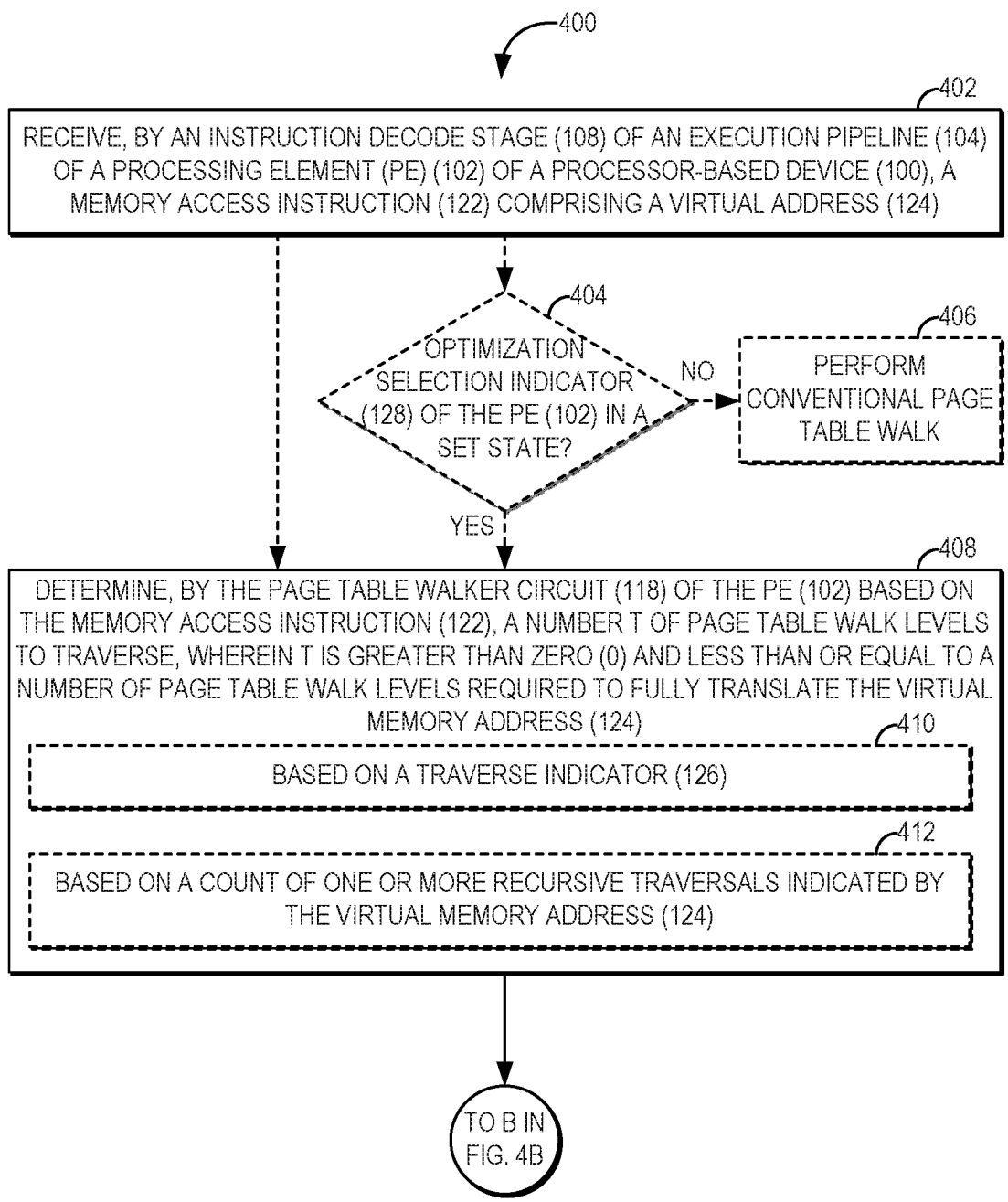
FIGS. 4A and 4B are flowcharts illustrating exemplary operations for optimizing access to page table entries.
Figure 4B:
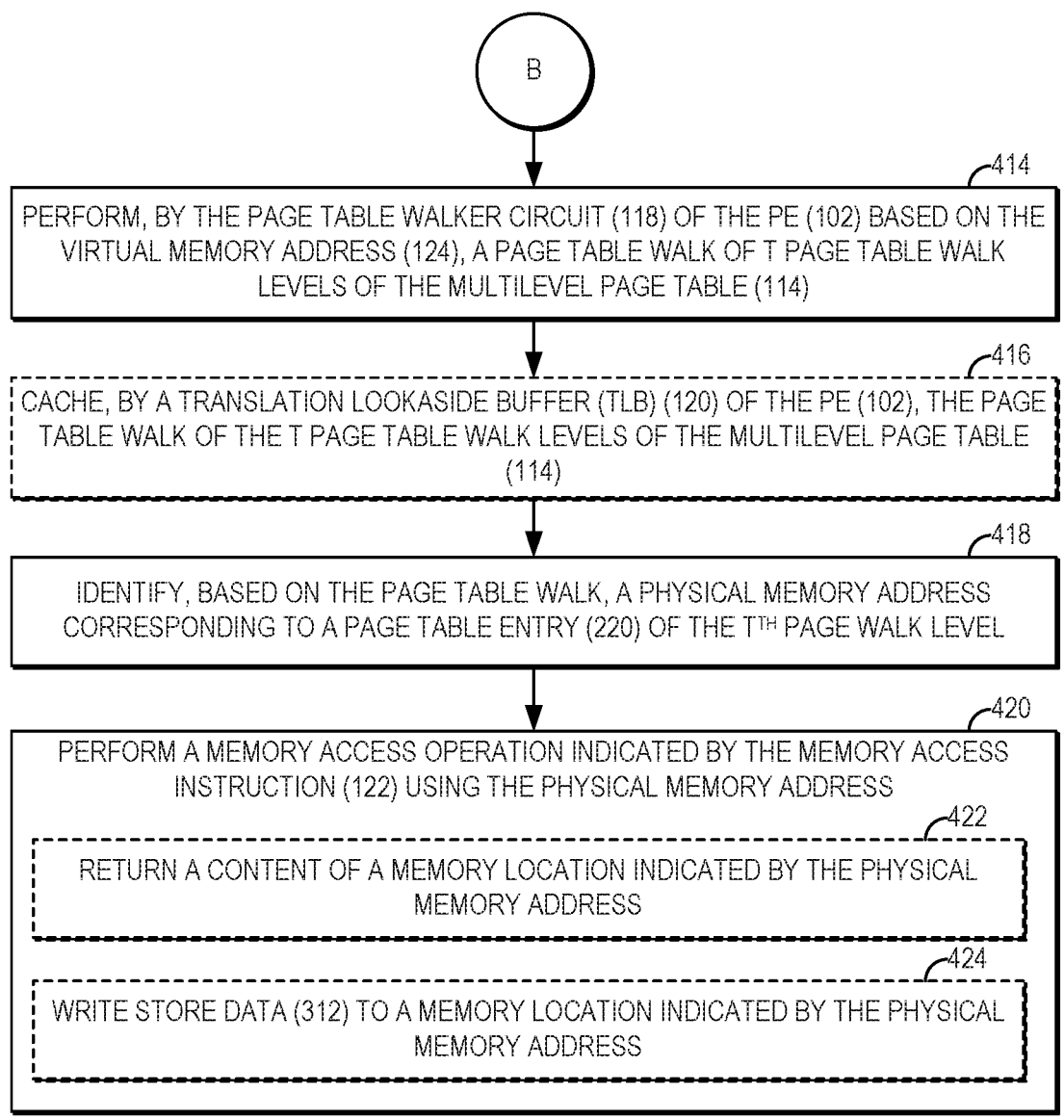

FIGS. 4A and 4B illustrate exemplary operations 400 for optimizing access to page table entries by the processor-based device 100 of FIG. 1. For the sake of clarity, elements of FIGS. 1 and 2 are referenced in describing FIGS. 4A and 4B. The operations 400 in FIG. 4A, according to some embodiments, begin with the instruction decode stage 108 of the execution pipeline 104 of the PE 102 of the processor-based device 100 receiving the memory access instruction 122 comprising the virtual memory address 124 (block 402). In embodiments in which the PE 102 provides the optimization selection indicator 128, the page table walker circuit 118 may determine whether the optimization selection indicator 128 of the PE 102 is in a set state (block 404). If not, the page table walker circuit 118 performs a conventional page table walk (block 406).

However, if the PE 102 determines at decision block 404 that the optimization selection indicator 128 is in a set state, or if the PE 102 does not provide the optimization selection indicator 128, the page table walker circuit 118 of the PE 102 determines, based on the memory access instruction 122, the number T of page table walk levels to traverse, wherein T is greater than zero (0) and less than or equal to a number of page table walk levels required to fully translate the virtual memory address 124 (block 408). In some embodiments, the operations of block 408 for determining the number T of page table walk levels to traverse may be based on the traverse indicator 126 (block 410). Some embodiments may provide that the operations of block 408 for determining the number T of page table walk levels to traverse may be based on a count of one or more recursive traversals indicated by the virtual memory address 124 (block 412). Processing then resumes at block 414 of FIG. 4B.

Referring now to FIG. 4B, the page table walker circuit 118 of the PE 102 next performs, based on the virtual memory address 124, a page table walk of T page table walk levels of the multilevel page table 114 (block 414). According to some embodiments, the TLB 120 may cache the page table walk of the T page table walk levels of the multilevel page table 114 (block 416). In such embodiments, the operations of block 414 for performing the page table walk of the T page table walk levels of the multilevel page table 114 may involve accessing a previously cached page table walk in the TLB 120 in response to a hit on the TLB 120. The page table walker circuit 118 then identifies, based on the page table walk, a physical memory address corresponding to a page table entry (such as the page table entry 220 of FIG. 2) of the Tth page table walk level (block 418). The PE 102 performs a memory access operation indicated by the memory access instruction 122 using the physical memory address (block 420). In some embodiments in which the memory access instruction 122 is the memory load instruction 300 of FIG. 3A or the memory read/modify/write instruction 312 of FIG. 3C, the operations of block 420 for performing the memory access operation may include returning a content of a memory location indicated by the physical memory address (block 422). Some embodiments in which the memory access instruction 122 is the memory store instruction 306 of FIG. 3B or the memory read/modify/ write instruction 312 of FIG. 3C may provide that the operations of block 420 for performing the memory access operation may include writing the store data 312 to a memory location indicated by the physical memory address (block 424).

Figure 5:
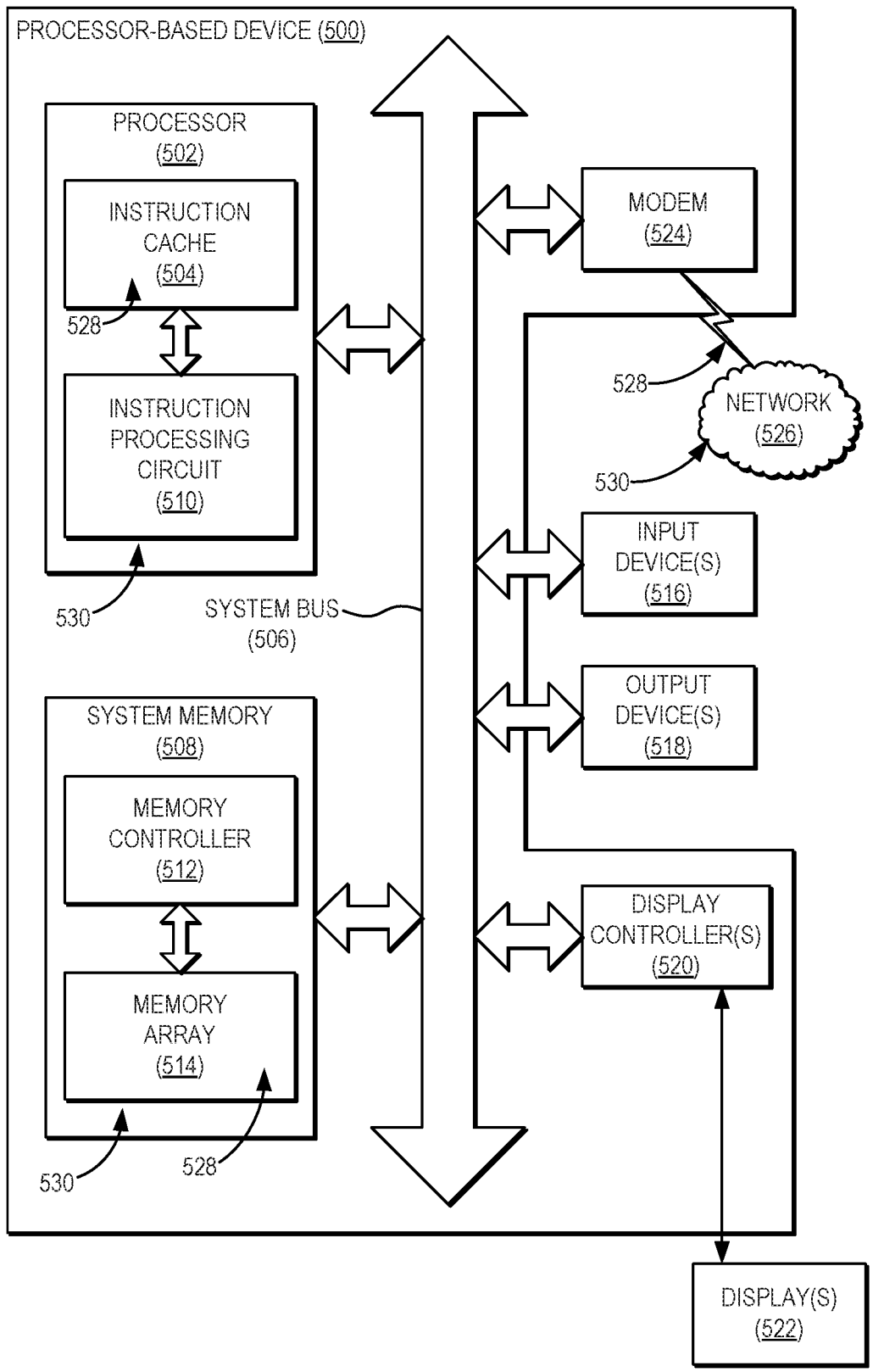
FIG. 5 is a block diagram of an exemplary processor-based device, such as the processor-based device of FIG. 1, that is configured to optimize access to page table entries.

FIG. 5 is a block diagram of an exemplary processor-based device 500, such as the processor-based device 100 of FIG. 1, that provides optimized access to page table entries. The processor-based device 500 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 500 includes a processor 502. The processor 502 represents one or more general-purpose processing circuits, such as a microprocessor, central processing unit, or the like, and may correspond to the PE 102 of FIG. 1. The processor 502 is configured to execute processing logic in instructions for performing the operations and steps discussed herein. In this example, the processor 502 includes an instruction cache 504 for temporary, fast access memory storage of instructions and an instruction processing circuit 510. Fetched or prefetched instructions from a memory, such as from a system memory 508 over a system bus 506, are stored in the instruction cache 504. The instruction processing circuit 510 is configured to process instructions fetched into the instruction cache 504 and process the instructions for execution.

The processor 502 and the system memory 508 are coupled to the system bus 506 and can intercouple peripheral devices included in the processor-based device 500. As is well known, the processor 502 communicates with these other devices by exchanging address, control, and data information over the system bus 506. For example, the processor 502 can communicate bus transaction requests to a memory controller 512 in the system memory 508 as an example of a peripheral device. Although not illustrated in FIG. 5, multiple system buses 506 could be provided, wherein each system bus constitutes a different fabric. In this example, the memory controller 512 is configured to provide memory access requests to a memory array 514 in the system memory 508. The memory array 514 is comprised of an array of storage bit cells for storing data. The system memory 508 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 506. As illustrated in FIG. 5, these devices can include the system memory 508, one or more input devices 516, one or more output devices 518, a modem 524, and one or more display controllers 520, as examples. The input device(s) 516 can include any type of input device, including, but not limited to, input keys, switches, voice processors, etc. The output device(s) 518 can include any type of output device, including, but not limited to, audio, video, other visual indicators, etc. The modem 524 can be any device configured to allow exchange of data to and from a network 526. The network 526 can be any type of network, including, but not limited to, a wired or wireless network, a private or public network, a local area network (LAN), a wireless local area network (WLAN), a wide area network (WAN), a BLUETOOTH™ network, and the Internet. The modem 524 can be configured to support any type of communications protocol desired. The processor 502 may also be configured to access the display controller(s) 520 over the system bus 506 to control information sent to one or more displays 522. The display(s) 522 can include any type of display, including, but not limited to, a cathode ray tube (CRT), a liquid crystal display (LCD), a plasma display, etc.

The processor-based device 500 in FIG. 5 may include a set of instructions 528 that may be encoded with the reach-based explicit consumer naming model to be executed by the processor 502 for any application desired according to the instructions. The instructions 528 may be stored in the system memory 508, processor 502, and/or instruction cache 504 as examples of non-transitory computer-readable medium 530. The instructions 528 may also reside, completely or at least partially, within the system memory 508 and/or within the processor 502 during their execution. The instructions 528 may further be transmitted or received over the network 526 via the modem 524, such that the network 526 includes the computer-readable medium 530.

While the computer-readable medium 530 is shown in an exemplary embodiment to be a single medium, the term "computer-readable medium" should be taken to include a single medium or multiple media (e.g., a centralized or distributed database, and/or associated caches and servers) that store the one or more sets of instructions 528. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
a system memory comprising a multilevel page table comprising a plurality of page tables, each page table comprising a plurality of page table entries; and
a processing element (PE) comprising:
an execution pipeline comprising an instruction decode stage; and
a page table walker circuit;
the PE configured to:
receive, using the instruction decode stage, a memory access instruction comprising a virtual memory address;
determine, using the page table walker circuit based on the memory access instruction, a number T of page table walk levels to traverse, wherein T is greater than zero (0) and less than or equal to a number of page table walk levels required to fully translate the virtual memory address;
perform, using the page table walker circuit based on the virtual memory address, a page table walk of T page table walk levels of the multilevel page table;
identify, based on the page table walk, a physical memory address corresponding to a page table entry of the Tth page table walk level; and
perform a memory access operation indicated by the memory access instruction using the physical memory address.

2. The processor-based device of claim 1, wherein:
the memory access instruction further comprises a traverse indicator that indicates the number T of page table walk levels to traverse; and
the PE is configured to determine the number T of page table walk levels to traverse based on the traverse indicator.

3. The processor-based device of claim 1, wherein:
the multilevel page table is configured to support recursive traversals;
the virtual memory address indicates one or more recursive traversals of the multilevel page table; and
the PE is configured to determine the number T of page table walk levels to traverse based on a count of the one or more recursive traversals indicated by the virtual memory address.

4. The processor-based device of claim 3, wherein:
the PE further comprises an optimization selection indicator; and
the PE is configured to determine the number T of page table walk levels to traverse based on the count of the one or more recursive traversals indicated by the virtual memory address responsive to the optimization selection indicator being in a set state.

5. The processor-based device of claim 1, wherein the PE further comprises a translation lookaside buffer (TLB) configured to cache the page table walk of T page table walk levels of the multilevel page table.

6. The processor-based device of claim 1, wherein:
the memory access instruction comprises a memory load instruction; and
the PE is configured to perform the memory access operation indicated by the memory access instruction using the physical memory address by being configured to return a content of a memory location indicated by the physical memory address.

7. The processor-based device of claim 1, wherein:
the memory access instruction comprises a memory store instruction;
the memory store instruction further comprises store data; and
the PE is configured to perform the memory access operation indicated by the memory access instruction using the physical memory address by being configured to write the store data to a memory location indicated by the physical memory address.

8. The processor-based device of claim 1, wherein:
the memory access instruction comprises a memory read/modify/write instruction;
the memory read/modify/write instruction further comprises store data; and
the PE is configured to perform the memory access operation indicated by the memory access instruction using the physical memory address by being configured to:
return a content of a memory location indicated by the physical memory address; and
write the store data to a memory location indicated by the physical memory address.

9. A method for optimizing access to page table entries, comprising:
receiving, by an instruction decode stage of an execution pipeline of a processing element (PE) of a processor-based device, a memory access instruction comprising a virtual memory address;
determining, by a page table walker circuit of the PE based on the memory access instruction, a number T of page table walk levels to traverse, wherein T is greater than zero (0) and less than or equal to a number of page table walk levels required to fully translate the virtual memory address;
performing, by the page table walker circuit of the PE based on the virtual memory address, a page table walk of T page table walk levels of a multilevel page table;
identifying, based on the page table walk, a physical memory address corresponding to a page table entry of the Tth page table walk level; and
performing a memory access operation indicated by the memory access instruction using the physical memory address.

10. The method of claim 9, wherein:
the memory access instruction further comprises a traverse indicator that indicates the number T of page table walk levels to traverse; and
determining the number T of page table walk levels to traverse is based on the traverse indicator.

11. The method of claim 9, wherein:
the multilevel page table is configured to support recursive traversals;
the virtual memory address indicates one or more recursive traversals of the multilevel page table; and
determining the number T of page table walk levels to traverse is based on a count of the one or more recursive traversals indicated by the virtual memory address.

12. The method of claim 11, wherein determining the number T of page table walk levels to traverse based on the count of the one or more recursive traversals indicated by the virtual memory address is responsive to an optimization selection indicator of the PE being in a set state.

13. The method of claim 9, further comprising caching, by a translation lookaside buffer (TLB) of the PE, the page table walk of T page table walk levels of the multilevel page table.

14. The method of claim 9, wherein:
the memory access instruction comprises a memory load instruction; and
performing the memory access operation indicated by the memory access instruction using the physical memory address comprises returning a content of a memory location indicated by the physical memory address.

15. The method of claim 9, wherein:
the memory access instruction comprises a memory store instruction;
the memory store instruction further comprises store data; and
performing the memory access operation indicated by the memory access instruction using the physical memory address comprises writing the store data to a memory location indicated by the physical memory address.

16. The method of claim 9, wherein:
the memory access instruction comprises a memory read/modify/write instruction;
the memory read/modify/write instruction further comprises store data; and
performing the memory access operation indicated by the memory access instruction using the physical memory address comprises:
returning a content of a memory location indicated by the physical memory address; and
writing the store data to a memory location indicated by the physical memory address.

17. A non-transitory computer-readable medium having stored thereon computer-executable instructions which, when executed by a processor, cause the processor to:
receive a memory access instruction comprising a virtual memory address;
determine, based on the memory access instruction, a number T of page table walk levels to traverse, wherein T is greater than zero (0) and less than or equal to a number of page table walk levels required to fully translate the virtual memory address;
perform, based on the virtual memory address, a page table walk of T page table walk levels of a multilevel page table;
identify, based on the page table walk, a physical memory address corresponding to a page table entry of the Tth page table walk level; and
perform a memory access operation indicated by the memory access instruction using the physical memory address.

18. The non-transitory computer-readable medium of claim 17, wherein:
the memory access instruction further comprises a traverse indicator that indicates the number T of page table walk levels to traverse; and
the computer-executable instructions cause the processor to determine the number T of page table walk levels to traverse based on the traverse indicator.

19. The non-transitory computer-readable medium of claim 17, wherein:
the multilevel page table is configured to support recursive traversals;
the virtual memory address indicates one or more recursive traversals of the multilevel page table; and
the computer-executable instructions cause the processor to determine the number T of page table walk levels to traverse based on a count of the one or more recursive traversals indicated by the virtual memory address.

20. The non-transitory computer-readable medium of claim 19, wherein the computer-executable instructions cause the processor to determine the number T of page table walk levels to traverse based on the count of the one or more recursive traversals indicated by the virtual memory address responsive to an optimization selection indicator being in a set state.

* * * * *